United States Patent
Glew

(10) Patent No.: US 6,297,843 B1
(45) Date of Patent: Oct. 2, 2001

(54) SYSTEM PROVIDING VIDEO COMPRESSION/ENCODING FOR COMMUNICATIONS ACROSS A NETWORK

(75) Inventor: Andrew F. Glew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/129,663

(22) Filed: Sep. 30, 1993

(51) Int. Cl.[7] .................................................. H04N 7/15
(52) U.S. Cl. ........................................ 348/14.13; 348/14.1
(58) Field of Search ..................................... 358/160, 183, 358/22, 185, 909, 134, 909.1; 348/384, 390, 571, 578, 722, 14.01, 14.08, 14.1, 14.13, 14.15, 723; 345/503; H04N 7/12, 5/225

(56) References Cited

U.S. PATENT DOCUMENTS

| | | | |
|---|---|---|---|
| 4,821,121 | * 4/1989 | Beamlier ............................... | 358/160 |
| 4,953,196 | * 8/1990 | Ishikawa et al. .................... | 358/134 X |
| 5,062,136 | * 10/1991 | Gattis et al. ......................... | 348/14.1 |
| 5,130,792 | * 7/1992 | Tindell et al. ....................... | 358/134 X |
| 5,136,383 | * 8/1992 | Shepard et al. ...................... | 358/160 |
| 5,138,503 | * 8/1992 | Nishida ................................ | 358/909 X |
| 5,153,730 | * 10/1992 | Nagasaki e al. .................... | 358/909 X |
| 5,189,693 | * 2/1993 | Nakajima ............................. | 358/468 |
| 5,258,859 | * 11/1993 | Wada e al. .......................... | 358/909 X |
| 5,335,321 | * 8/1994 | Harney et al. ....................... | 345/503 |
| 5,548,324 | * 8/1996 | Downs et al. ....................... | 348/14.1 |

FOREIGN PATENT DOCUMENTS 0574748  5/1993 (EP) ................................ G06F/13/42

OTHER PUBLICATIONS

Crowcroft, J. Et Al. Some Multimedia Traffic Characterisation and Measurement Results Proceedings of the Conference on Telecommunications, Manchester, 1993, pp. 167–174.

Yager T. "Better Than Being There" Desktop Video Teleconferencing could change how you do business, Mar. 1993, pp. 129–130, 132–134.

* cited by examiner

*Primary Examiner*—John W. Miller
(74) *Attorney, Agent, or Firm*—Blakely, Sokoloff, Taylor & Zafman LLP

(57) ABSTRACT

A system providing video compression/encoding functions incorporates an integrated video apparatus which includes a camera for capturing an image, a frame grabber coupled to the camera for storing a bitmap of the image, and a video processor coupled to the frame grabber. The video processor is coupled to the system bus and to a dedicated memory and executes an algorithm which compresses the bitmap into an encoded bitstream. A central processing unit manages the transfer of the encoded bitstream from the video processor to the network utilizing a main memory coupled to the system bus.

13 Claims, 1 Drawing Sheet

SYSTEM PROVIDING VIDEO COMPRESSION/ENCODING FOR COMMUNICATIONS ACROSS A NETWORK

FIELD OF THE INVENTION

This invention relates to the field of computer-based video. More specifically, the invention relates to the capture of motion video in digital form, and to the compression of such motion video so as to reduce space and bandwidth requirements. The invention also relates to systems which combine video capture and processing with store and/or telecommunications capabilities.

BACKGROUND OF THE INVENTION

There is an increased emphasis today on the development of computing tools which incorporate digital video capabilities. For example, a common computing application is the use of a teleconferencing workstation in which digital video information is transmitted across ordinary telephone lines. Conventional teleconferencing systems consist of a camera which captures an image and outputs a digital stream of data. This data is then compressed by an ordinary processor and encoded for subsequent transmission across phone lines. At the other end of the phone lines, another processing device performs the decoding process, which is simply the inverse of the encoding algorithm. Eventually, the original digital video information is retrieved and stored at the destination computing resource. Typically, a central processing unit of a microprocessor is utilized to perform both the encoding and decoding functions in present teleconferencing systems.

One problem with these prior art approaches is that system performance is usually constrained by the memory traffic along the various data pathways. For instance, digital information output from the camera is typically transmitted to the central processing unit along a system bus, which also communicates with a main memory. Data transmission between the CPU, camera, memory, and network across the system bus is slowed by the frequent memory traffic associated with normal video processing. In certain circumstances, adding a cache memory can actually increase the memory traffic since the cache must frequently access the main memory (e.g., during writebacks, updates, etc.).

Another problem with such systems is that the video camera, frame grabber board and the compression hardware are separate components. This means that each of these components must be interfaced and maintained separately, as described above.

By way of example, video information is usually transmitted from by the camera at data rates in excess of 10 megabytes per second (MB/sec). In teleconferencing applications, this video data eventually gets sent to the outside world via a network. In the meantime, however, the network is also sending encoded images back to the central processing unit to be decoded. The decoding process requires that the information first be written to memory, and then be operated on by the central processing unit. This tends to increase the memory traffic along the system bus.

As will be seen, the present invention offers a system providing video compression/encoding for communications across a network which alleviates much of the memory traffic along the system bus. The novel features of the invention allow for a dramatic decrease in the memory bandwidth requirements of the system, as well as providing increased video processing and computational abilities.

SUMMARY OF THE INVENTION

A system providing video compression/encoding functions is described. In one embodiment, the system includes a system bus coupled to a communications network The system incorporates an integrated video apparatus which includes a camera for capturing an image, a frame grabber coupled to the camera for storing a bitmap of the image, and a video processor coupled to the frame grabber. The video processor executes an algorithm which compresses the bitmap into an encoded bitstream. The processor itself is coupled to the system bus and also to a dedicated memory. The integration of the camera, frame grabber, and video processor into a single package or subsystem prevents high bandwidth raw unencoded video data from crossing unit boundaries.

Also coupled to the system bus is a central processing unit for managing the transfer of the encoded bitstream from the video processor to the network. The central processing unit utilizes a main memory coupled to the system bus and has the capability for forming additional image manipulation, if desirable.

BRIEF DESCRIPTION OF THE DRAWINGS

The present invention will be understood more fully from the detailed description which follows and from the accompanying drawings, which, however, should not be taken to limit the invention to the specific embodiments shown but are for explanation and understanding only.

DETAILED DESCRIPTION

A telecommunications system including video processing capabilities is disclosed. In the following description, numerous specific details are set forth in order to provide a thorough understanding of present invention. It will be obvious, however, to one skilled in the art that these specific details need not be employed to practice the present invention. In other instances, well-known logic gates, circuits, algorithms, etc., are not described in detail in order to avoid unnecessarily obscuring the present invention.

Figure 1:
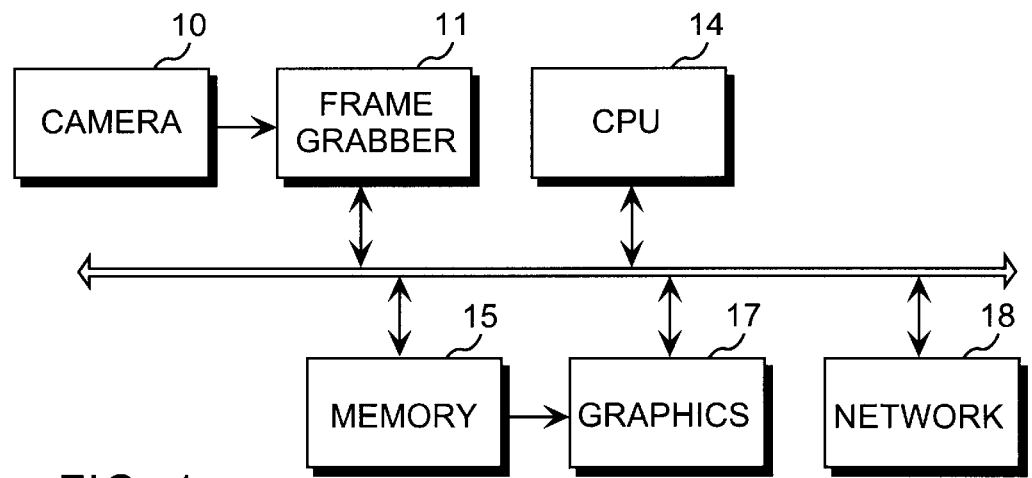
FIG. 1 is a block diagram illustrating a prior art video telecommunications system.

With reference to FIG. 1, there is shown a typical prior art teleconferencing workstation system. The system of FIG. 1 includes a camera 10 coupled to a frame grabber 11. Frame grabber 11 takes the video information captured by camera 10 and sends it to memory 15 along system bus 12. Memory 15 typically comprises a main memory, such as random-access memory (RAM) normally associated with a conventional computer system. Central processing unit (CPU) 14 reads the information stored in memory 15 via bus 12, or directly accesses private memory in frame grabber 11, and performs the compression/encoding operations on the video data. The result is a encoded bitstream which is then sent via bus 12 to network 18. The prior art system of FIG. 1 commonly includes a graphics unit 17 coupled to system bus 12 to assist in the presentation aspects of the video transmission.

Most often, network 18 comprises ordinary phone lines which are connected to another computer system such as that shown in FIG. 1. At the other end of the phone lines, the receiving telecommunications workstation performs the decode process, which is simply the inverse of the encoding process. The encoded bitstream is received by system bus 12 via network 18 and is stored in memory 15. CPU 14 then performs the decoding process on the video information resident in memory 15. It is appreciated that, in general, the decoding process is typically performed at a much faster speed as compared to the encoding process (e.g., 4–8×). However, it is not uncommon that CPU 14 is required to execute both the encoding and decoding processes at the same time, as video information is both transmitted and received across network 18.

The problem with the video system of FIG. 1 is that there is a great deal of memory traffic along all of the data pathways. By way of example, frame grabber 11 is constantly generating data to be stored in memory 15, whereas CPU 14 is repeatedly accessing memory 15 to process the data during the encoding and decoding processes. Meanwhile, encoded data is being received across network 18 and processed by CPU 14 to reproduce the transmitted image. All the time, both encoded and decoded video data is constantly being written and read to/from memory 15 by CPU 14.

Figure 2:
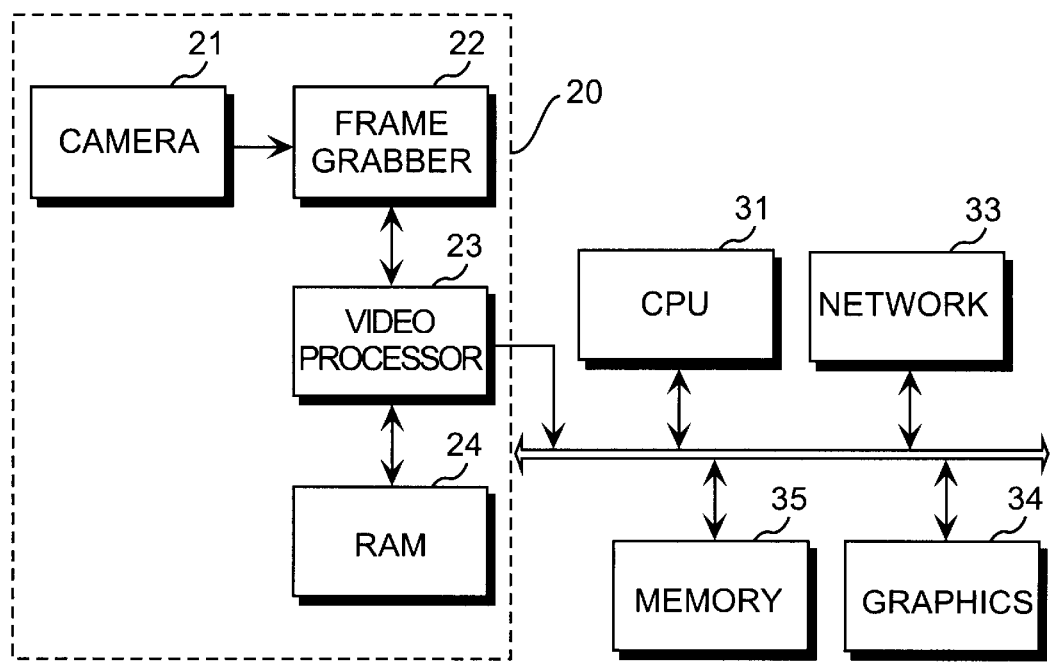
FIG. 2 illustrates the video system of the present invention.

The present invention alleviates the much of the memory traffic by integrating the image capture and video compression/encoding processes in the same subsystem. The invention takes advantage of the fact that often times, the video processing data pathway is the highest bandwidth section of the communication system. For example, video information output by the frame grabber is often generated at a data rate of 10 megabytes per second or greater. FIG. 2 illustrates the system of the present invention including subsystem 20 comprising camera 21 coupled to frame grabber 22. Frame grabber 22, in turn, is coupled to a video processor 23. Video processor is coupled to a dedicated scratch memory 24 (i.e., RAM) and to system bus 30. System bus 30, in turn, is coupled to CPU 31, main memory 35, graphics unit 34, and network 33.

In the video system of FIG. 2, video processor 23 is dedicated to producing the compressed/encoded bitstream from the video image captured by camera 21 and frame grabber 22. Video processor 23 outputs this encoded bitstream to CPU 31 along system bus 30. Because the encoding process is handled by dedicated processor 23, the involvement of CPU 31 with the video encoding process is reduced to simply controlling the flow of the encoded information between the integrated camera/encoder subsystem 20 and network 33. Because CPU 31 no longer is required to compress/encode the video information, much of the memory traffic on bus 30 is eliminated. By way of example, in a typical teleconferencing application, CPU 31 only performs image decompression, which is an order of magnitude faster than the compression/encoding process. This also frees CPU 31 so that it can perform additional memory manipulations involving various presentation aspects (e.g., color tuning, scaling, etc.) of the video transmission. It is appreciated, however, that most of the computational and memory bandwidth intensive operations are performed by video processor 23 utilizing dedicated memory 24.

As stated, the function of video processor 23 is to compress and encode the video information received by frame grabber 22. Instead of accessing main memory to perform these operations, video processor 23 is provided with a dedicated scratch memory 24, which typically comprises ordinary random-access memory. Scratch memory 24 is primarily used by video processor 23 to perform computationally intensive operations, such as difference calculation between various frames, subtracting one frame from the video image of another, etc.

The salient point to remember, however, is that the data pathways involving the camera 21, frame grabber 22, video processor 23, and scratch memory 24 require a high bandwidth channel (on the order of 10 megabytes per second or greater). On the other hand, the encoded bitstream output by video processor 23 to system bus 30 has a reduced bandwidth on the order of 10 kilobytes per second or less. Therefore, by packaging the video capture and the video compression/encoding functions in the same subsystem, the present invention manages to dramatically decrease the memory bandwidth requirements and the corresponding memory traffic in a telecommunications system. This dramatically reduces the memory bandwidth required between the camera and computer system as well as reducing the computational loading of the CPU. Moreover, the use of a special purpose or dedicated video processor 23 within subsystem 20 minimally intrudes upon the general purpose CPU 31.

In summary, the present invention takes the encoding and compression functions that deal with video processing, along with a portion of dedicated memory, and packages it into a subsystem along with the camera and frame grabber. The result frees up the operation of the general purpose central processing unit for increased bandwidth and enhanced computation speed. The system configuration also allows the CPU to do specialized image manipulation functions such as cropping, isolating a portion of a picture, scaling, etc. Besides the decoding function, the main purpose of the CPU is to manage the transfer of data from the video processor to the network.

I claim:

1. A system providing video compression/encoding for communications across a network, said system comprising:

a system bus for connection to said network;

an integrated video apparatus including a camera for capturing an image; a frame grabber coupled to said camera, said frame grabber storing a bitmap of said image; a video processor coupled to said frame grabber and to said system bus, said video processor for executing an algorithm which compresses said bitmap into an encoded bitstream; a dedicated memory coupled to said video processor; and a central processor unit coupled to said system bus for managing the transfer of said bitstream from said video processor to said network.

2. The system of claim 1 further comprising a main memory coupled to said system bus, said main memory being accessed by said central processing unit.

3. The system of claim 2 further comprising a graphics unit coupled to said system bus.

4. The system of claim 1 wherein said bitstream is transferred across said system bus at a rate which is slower as compared to the data transfer rate between said video processor and said dedicated memory.

5. The system of claim 2 wherein said bitstream is transferred across said system bus at a rate which is slower as compared to the data transfer rate between said camera and said frame grabber.

6. A telecommunications system comprising:

a subsystem integrating a camera; a frame grabber for receiving video information from said camera at a first data rate and storing said video information in a bitmap; a video processor for operating on said video information by compressing/encoding said bitmap into a data stream; and, a scratch memory for temporary storage of digital data utilized by said video processor, data transfer between said scratch memory and said video processor occurring at a second data rate;

a system bus coupled to said video processor of said subsystem;

a communications network coupled to said system bus;

a central processor coupled to said system bus for managing the transfer of said data stream from said video processor to said network, said transfer of said data stream occurring at a third data rate.

7. The system of claim 6 further comprising a main memory coupled to said system bus for storage of data received from said central processor.

8. The system of claim 7 further comprising a graphics unit coupled to said system bus.

9. The system of claim 6 wherein said third data rate is significantly slower than said first or said second data rates.

10. The system of claim 6 wherein said first and second data rates exceed one megabyte per second.

11. The system of claim 6 wherein said third data rate is on the order of 10 kilobytes per second.

12. An integrated camera and video compression/encoding apparatus for transfer of video data across a communications network, said apparatus comprising:

a camera;

a frame grabber for storing video information received from said camera in the form of a bitmap;

a dedicated video processor for compressing/encoding said bitmap into a data stream for subsequent transfer across said communications network;

a memory for temporary storage of digital data utilized by said dedicated video processor, the data transfer rate between said dedicated video processor and said memory means being faster as compared to the data transfer rate of said data stream from said dedicated video processor to said communications network.

13. The integrated camera and video compression/encoding apparatus of claim 12 wherein said data stream has a data rate of approximately 10 kilobytes per second.

* * * * *